Figure 3:
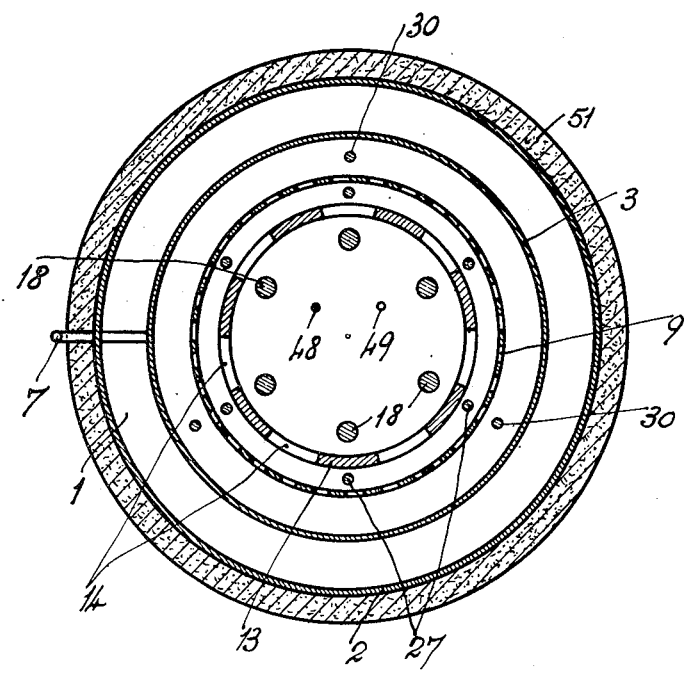

March 16, 1954　　　　F. BARIL　　　　2,672,239
CONTINUOUS FILTER WITH INTERNAL HEAT EXCHANGES
AND AUTOMATIC REMOVAL OF SEDIMENTS
Filed Oct. 25, 1950　　　　　　　　　3 Sheets-Sheet 1
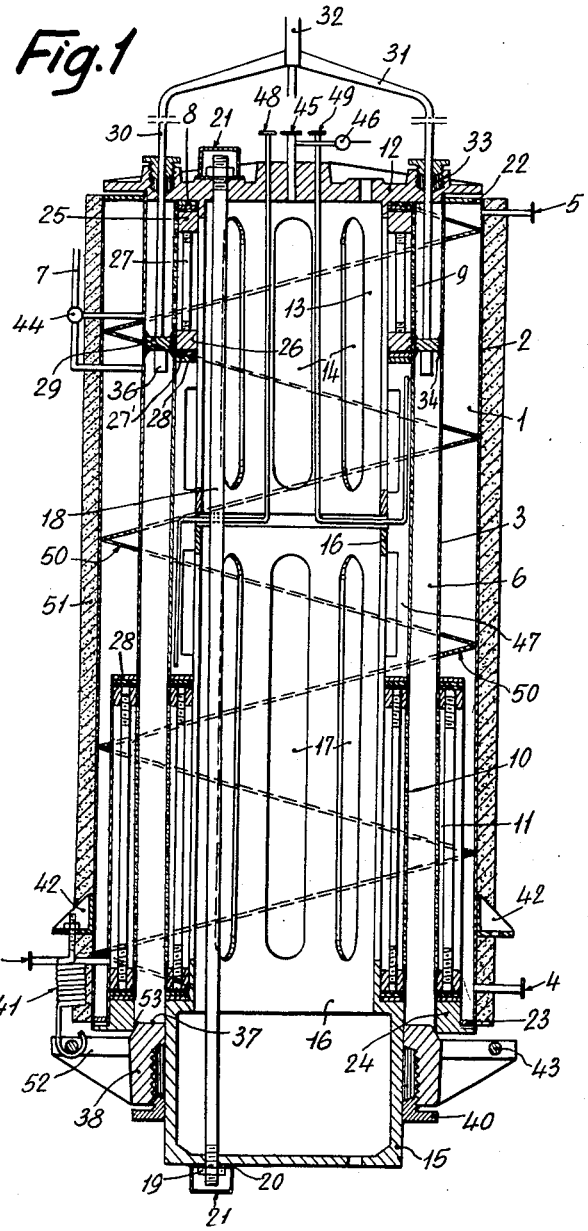
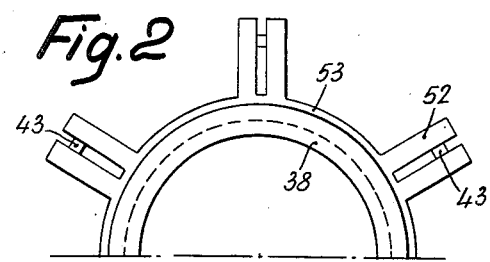
INVENTOR
FERNAND BARIL
ATTORNEY March 16, 1954     F. BARIL     2,672,239
CONTINUOUS FILTER WITH INTERNAL HEAT EXCHANGES
AND AUTOMATIC REMOVAL OF SEDIMENTS
Filed Oct. 25, 1950     3 Sheets-Sheet 3

Inventor
Fernand Baril
by Malcolm W. Fraser
Attorney

Patented Mar. 16, 1954

2,672,239

UNITED STATES PATENT OFFICE 2,672,239

CONTINUOUS FILTER WITH INTERNAL HEAT EXCHANGES AND AUTOMATIC REMOVAL OF SEDIMENTS

Fernand Baril, Labuissiere, France

Application October 25, 1950, Serial No. 192,104

Claims priority, application France November 22, 1949

4 Claims. (Cl. 210—150.5)

1

This invention has for its object to provide a continuously operating filter with internal heat exchange and automatic removal of sediments, which has application to filtering all kinds of fluids for domestic and industrial purposes. Being of very sturdy construction, this filter may, however, be rapidly dismantled and mounted again with great facility, and it may be readily adapted, without any notable constructional modification, for filtering all kinds of products such as those dealt with in chemical industries, e. g., for eliminating naphtaline, anthracine, paraffin, in treating all kinds of oils, as well as in breweries, sugar-works, etc.

Frequently, it is necessary to provide, simultaneously with the filtration proper of a fluid, a thermal treatment for the latter, that is, either cooling or reheating, intended for example to facilitate the flow thereof or the separation of liquid and solid phases. In order to carry out this operation, there are generally provided heat exchangers placed in the circuit of the fluid, ahead of the filtering apparatus. Besides that this disposition calls for a plurality of apparatus, it does not permit of obtaining a high thermal efficiency, because of unavoidable heat losses occurring in between the various apparatus.

The filter according to this invention is free from all these shortcomings and permits, by means of a single apparatus and with a high efficiency, very rapid and strong heat exchange, even at very low temperatures, and a positive filtration, in continuous operation. This filter permits of solving, namely, the problem of the flow of a cooled liquid in contact with crystals, resulting in a mixture which flows with great difficulty through valves and pipes and which adheres readily to the walls of tanks and coils; the crystallization, however, may be positively controlled and directed, by regulating the rate of filtration and the temperature of the fluid, into the apparatus.

The filter according to the invention comprises essentially, in combination, a vertical outer cylindric annular envelope through which there is circulated a fluid intended to maintain at the desired temperature the product to be filtered, an inner envelope, concentric with said outer envelope serving also as a heat exchanger, an annular filtering chamber between the said two concentric envelopes, into which is admitted the product to be filtered and the walls of which are partly constituted by filtering surfaces, and movable means for ensuring the evacuation of sediments at the lower end of the apparatus.

2

According to one feature of the invention, the filtering surfaces of the filtration chamber are provided at the lower end of this chamber on its two faces, and at the upper end thereof on the inner face only, the lower filtering surfaces being effective for the periods of normal operation, while the upper filtering surface is set in action for sediments evacuating operations, to ensure the continuous filtration.

In order that the filtering surfaces may be rapidly dismantled and replaced, the same are detachably mounted on the chamber walls.

According to a further feature of the invention, said movable means for ensuring the evacuation of sediments at the lower end of the filtration chamber comprise a movable bottom adapted to obturate, for the working period, the annular chamber bottom and to apply resiliently against the latter, and an annular piston adapted to slide axially downwards within the filtration chamber, so as to remove the said movable bottom away from the chamber bottom and thereby to permit the evacuation of sediments.

With this disposition, the annular piston, maintained in its high position during the normal working periods of the apparatus, isolates the upper filtering surface which is then not utilized, whereas the filtration is effected through the lower filtering surfaces; during the sediments evacuating operations, the annular piston is lowered and the liquid to be filtered is directed, through a three-way valve, towards the upper filtering surface, when the lower filtering surfaces are found to be isolated, so that the continuity of filtering operations is ensured by setting in action the upper filtering surface.

Further features of the present invention will be apparent from the following description and appended claims.

Figure 4:
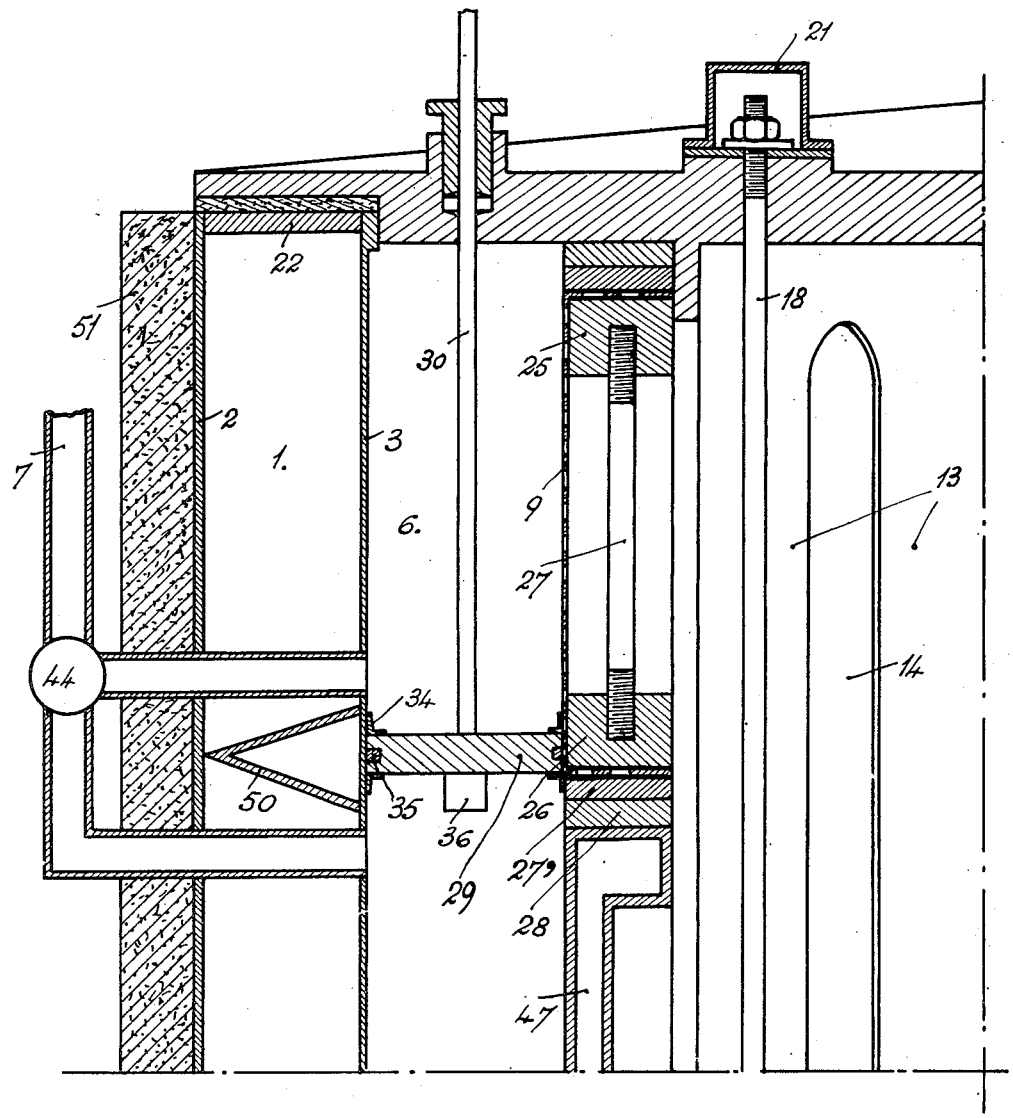

The invention will be described with reference to the accompanying drawings given merely by way of example and in which:

Fig. 1 is a vertical section of a filter according to the present invention; Fig. 2 is a plan view showing a portion of the movable bottom of the apparatus shown in Fig. 1; Figure 3 is a transverse sectional view of the structure shown in Figure 1, looking downwardly; and Figure 4 is an enlarged sectional view of the inlet area showing the heat exchange and filter chamber structure.

The filter, whose longitudinal section is shown in Fig. 1, has an annular outer envelope 1 defined by two cylindric steel plates 2 and 3 between which there is circulated a fluid intended to maintain at the desired temperature the liquid to be filtered. This fluid flows into the envelope 1 through a pipe 4 and flows out through a pipe 5.

In the inner envelope 6, which is concentric with the envelope 1 and constitutes the filtration chamber, is circulated the liquid to be filtered, admitted, under pressure, through a pipe 7 and evacuated, at the end of operation, through pipes 8 and 45.

This filtration chamber, of considerable height, is strictly vertical, without any section thereof being conic frustum-shaped, whereby the decantation is facilitated. Moreover, its small cross-section permits of accelerating heat exchange between the fluid, having the thermal potential, and the liquid to be filtered, this liquid being thus treated thin layer fashion.

The filtering surfaces proper are provided, on one hand, at the upper end of the chamber 6, as at 9, on the inner face of the latter and, on the other hand, as at 10 and 11, at the lower end of the apparatus, both on the inner and outer walls of chamber 6. These filtering surfaces are constituted, in the usual way, by wire gauze, filtering cloth, filtering stone or earth, or the like, according to the nature of the products to be filtered, their chemical or physical composition, their temperature, etc.

The apparatus is topped with a cover 12 having a downward cylindric sheath-like extension 13 provided with longitudinal ports 14 which reduce the appartus weight and through which is effected the evacuation of the liquid filtered.

The filter is provided with a stationary bottom 15 having an upward cylindric sheath-like extension 16 of a diameter equal to that of the extension 13, and which is also provided with ports, such as 17. The two members 12 and 15 are rigidly connected with each other by means of rods, such as 18, having their ends screw-threaded and firmly held in place by tightening nuts and washers 19—20. The outstanding ends of rods 18, together with their nuts and washers 19—20, are confined in sealing caps such as 21.

The walls 2 and 3 of the outer envelope have their upper ends connected by a ring 22 and their lower ends by a ring 23, these two rings being made from a metal plate sufficiently thick to permit, on one hand, of centering the stationary cover 12 and securing the same to the ring 22 and, on the other hand, of securing to the ring 23, for example by means of pins, a rim 24 serving to support the filtering outer surface 11.

The mounting of the latter is effected similarly to that of the filtering surface 9 which, being constituted for example by wire-cloth, has its upper and lower ends flanged inwards at right angles, the two flanges, thus formed, being applied, respectively, against two rims 25, 26 held at the desired distance from each other by means of rods, such as 27, which have their ends screw-threaded in opposite directions and permit, when being rotated, of regulating the tension of the filtering cloth 9. The latter is secured onto the rims 25, 26 by means of rings, such as 28, affixed to the rims by flat-head screws (not shown) in a manner to form annular tight joint 27' between the liquid to be filtered and the liquid leaving the filters.

During the period of normal operation, the filtration is effected through the surfaces 10 and 11 of the lower portion of the filter. The upper filtering surface 9 is isolated from the remainder of the apparatus by an annular piston 29 adapted to move within the inner envelope 6. To this end, the piston 29 carries three rods, such as 30, extended through the cover 12 and terminated by arms 31. The three arms 31 are made rigid with a central shaft 32 adapted to be displaced axially, for example with the aid of a hydraulic jack of known type (not shown). The passage of the rods 30 through the cover 12 is made tight by means of stuffing-boxes such as 33. The annular piston 29 is provided with scraping surfaces 34, applied against the two walls of the chamber 6, and with packing segments 35 whose type varies with the nature and pressure of the liquid to be filtered.

On the lower face of the annular piston 29 there are secured lugs or protrusions 36 adapted, when the piston is brought to its lowermost position, to apply against an annular shoulder 37 managed on a movable bottom 38 which encompasses the stationary bottom 15 and is slidable on the latter. A stuffing box 40 ensures the tightness of the movable bottom 38 on the stationary bottom 15. During the normal filtration, that is, when the piston 29 is in its high position, the movable bottom 38 is strongly applied against the stationary rim 24 by springs, such as 41, the upper ends of which are in threaded relationship to brackets 42 rigid with the wall 2 of outer envelope, while the lower ends thereof are formed with hooks adapted to engage pins, such as 43, being in rigid relationship to the movable bottom 38. The threaded upper ends of said springs permit of adjusting the initial tension of the latter to the desired value.

During the period of automatic evacuation of sediments the piston 29 is lowered. By adequately handling a three-way valve 44, mounted across the liquid inlet pipe 7, it is possible to direct the liquid toward the upper portion of the filter, the continuity of the filtration being thus ensured by the upper filtering surfaces 9. During its downstroke the piston 29 comes to scrape, by its surfaces 34, the filters 10 and 11 and causes, at the end of its downstroke, the movable bottom 38 to slide in the same sense either under the action of the sediments gathered in the envelope 6 and forced down by the piston, or under the action of the lugs 36 coming to apply against the annular shoulder 37. The bottom 38 moves away from the rim 24 and the sediments are thus evacuated automatically.

As hereinabove explained, the liquid to be filtered is fed in through the pipe 7. After filtration, the liquid filtered through the filtering outer surface 11 is evacuated through the pipe 8, while the liquid, having passed through the inner filtering surfaces 10 or 9, is evacuated through the pipe 45. A throttle valve 46, mounted across the pipe 45, permits of limiting to a reasonable value the pressure exerted on the stationary members 12 and 15.

The fluid commissioned to transmit its temperature to the liquid to be filtered is admitted into the inner envelope 47 through a pipe 48 and flows out through a pipe 49. In the outer annular enclosure 1 the fluid flows in through the pipe 4 and flows out through the pipe 5. A metallic spiral 50, ensuring a crucial circulation of the fluid in the enclosure 1, increases the speed of circulation and promotes heat exchange by convection, without excessive loss of heat. This metallic spiral 50 is welded to the outer envelope 2, but is not welded to the inner envelope 3, so as to prevent deformation of the latter at the time of welding.

In order to reach low temperatures, inferior to the freezing point of brines, use may be made of the direct expansion in freezing machines. In this case the enclosures 1 and 47 would receive directly the cold generating fluid and would function as evaporators.

It will be of advantage to surround the apparatus, as above described with a heat-insulating layer 51.

Fig. 2 is a plan view showing a portion of the movable bottom 38. It will be seen that the latter has a number of lugs, such as 52, provided with pins 43 serving to hook on the springs 41. It will also be seen that the movable bottom 38 applies against the rim 24 along an annular seat 53 that may be rapidly ground, if necessary, to render leak-proof the filtration chamber at its lower end.

The apparatus can be dismantled with great facility, particularly with a view to cleaning or replacing the filtering surfaces; all that is necessary therefor is to release the springs 41 from their lugs of fixation onto the movable bottom 38 and to unbolt the rim 24. Moreover, by withdrawing the threaded rods 18, it is possible to dismantle the apparatus completely.

In order to facilitate its dismantling, the filter hereinabove described and which operates in the vertical position, may be mounted, for example, to pivot on horizontal axle or axles arranged substantially midway of its ends, so that the apparatus may be swung into horizontal position, except for its operational periods.

What I claim is:

1. A continuous filter for producing the automatic removal of sediments, comprising an annular filtering chamber having a vertical axis, said filtering chamber including in the lower portion of its inner and outer walls filtering sections and in the upper part of the inner wall a further filtering section, a vertically movable annular bottom adapted to close the lower end of said filtering chamber, elastic means urging energetically said movable bottom against the lower end of the filtering chamber to close same, an annular vertically movable piston slidingly fitted inside the filtering chamber and adapted to move vertically between a point located in the interval between the two filtering sections in the outer wall and a point near the lower end of said filtering chamber, means urging said piston downwardly along its path, projecting studs rigid with the lower edge of the piston, a pipe feeding the liquid to be filtered into the upper part of the filtration chamber to either side selectively of the uppermost location of the piston, an annular closed chamber surrounding the filtering chamber throughout the height of the lower filtering section in the outer wall of said chamber for communication therethrough with the filtering chamber, means for removing the filtered liquid opening into said annular closed chamber, an annular closed casing on the outside of said filtering chamber and extending at least over part of its height, a cap for the upper end of the filtering chamber and of the annular closed casing, further means for removing the filtered liquid passing through said cap, a cover for the lower end of the annular chamber, means for introducing a heat-exchanging medium into the outer annular closed casing and means for removing said heat-exchanging medium out of said outer casing, an annular closed casing on the inside of said filtering chamber, means for introducing a heat-exchanging medium into said last mentioned casing and means for removing said medium out of said last mentioned casing.

2. A continuous filter for producing the automatic removal of sediments, comprising an annular filtering chamber having a vertical axis, said filtering chamber including in the lower portion of its inner and outer walls filtering sections and in the upper part of the inner wall a further filtering section, a vertically movable annular bottom adapted to close the lower end of said filtering chamber, elastic means urging energetically said movable bottom against the lower end of the filtering chamber to close same, an annular vertically movable piston slidingly fitted inside the filtering chamber and adapted to move vertically between a point located in the interval between the two filtering sections in the outer wall and a point nearer the lower end of said filtering chamber, means urging said piston downwardly along its path, projecting studs rigid with the lower edge of the piston, a pipe feeding the liquid to be filtered into the upper part of the filtration chamber to either side selectively of the uppermost location of the piston, an annular closed chamber surrounding the filtering chamber throughout the height of the lower filtering section in the outer wall of said chamber for communication therethrough with the filtering chamber, means for removing the filtered liquid opening into said annular closed chamber, an annular closed casing on the outside of said filtering chamber and extending at least over part of its height, a cap for the upper end of the filtering chamber and of the annular closed casing, an openwork sheath rigid with the lower part of said cap and extending coaxially inside the annular filtering chamber, further means for removing the filtered liquid passing through said cap, a cover for the lower end of the annular chamber, an openwork sheath rigid with the upper part of the cover and extending coaxially inside the filtering chamber, means for introducing a heat-exchanging medium into the outer annular closed casing and means for removing said heat-exchanging medium out of said outer casing, an annular closed casing on the inside of said filtering chamber and outside the two openwork sheaths, means for introducing a heat-exchanging medium into said last mentioned casing and means for removing said medium out of said last mentioned casing.

3. A continuous filter for producing the automatic removal of sediments, comprising an annular filtering chamber having a vertical axis, said filtering chamber including in the lower portion of its inner and outer walls filtering sectoins and in the upper part of the inner wall a further filtering section, a vertically movable annular bottom adapted to close the lower end of said filtering chamber, elastic means urging energetically said movable bottom against the lower end of the filtering chamber to close same, an annular vertically movable piston slidingly fitted inside the filtering chamber and adapted to move vertically between a point located in the interval between the two filtering sections in the outer wall and a point near the lower end of said filtering chamber, means urging said piston downwardly along its path, a pipe feeding the liquid to be filtered into the upper part of the filtration chamber above the uppermost location of said piston, a second pipe feeding said liquid to the upper part of said chamber underneath said location, a common supply for said feeding pipes, a three-way cock controlling the connection between the supply and said feeding pipes, an annular closed chamber surrounding the filtering chamber throughout the height of the lower filtering section in the outer wall of said chamber for communication therethrough with the filtering chamber, means for removing the filtered liquid opening into said annular closed chamber, an annular closed casing on the outside of said filtering chamber and extending at least over part of its height, a cap for the upper end of the filtering chamber and of the annular closed casing, further means for removing the filtered liquid passing through said cap, a cover for the lower end of the annular chamber, means for introducing a heat-exchanging medium into the outer annular closed casing and means for removing said heat-exchanging medium out of said outer casing, an annular closed casing on the inside of said filtering chamber, means for introducing a heat-exchanging medium into said last mentioned casing and means for removing said medium out of said last mentioned casing.

4. A continuous filter for producing the automatic removal of sediments, comprising an annular filtering chamber having a vertical axis, said filtering chamber including in the lower portion of its inner and outer walls filtering sections and in the upper part of the inner wall a further filtering section, a vertically movable annular bottom adapted to close the lower end of said filtering chamber, elastic means urging energetically said movable bottom against the lower end of the filtering chamber to close same, an annular vertically movable piston slidingly fitted inside the filtering chamber and adapted to move vertically between a point located in the interval between the two filtering sections in the outer wall and a point near the lower end of said filtering chamber, means urging said piston downwardly along its path, projecting studs rigid with the lower edge of the piston, a pipe feeding the liquid to be filtered into the upper part of the filtering chamber to either side selectively of the uppermost location of the piston, an annular closed chamber surrounding the filtering chamber throughout the height of the lower filtering section in the outer wall in the chamber for communication therethrough with the filtering chamber, means for removing the filtered liquid opening into said annular closed member of the annular chamber, an annular closed casing on the outside of said filtering chamber and extending at least over part of its height and on the outside of the annular closed chamber, a cap for the upper end of the filtering chamber and of the annular closed casing, further means for removing the filtered liquid passing through said cap, a cover for the lower end of the annular chamber, means for introducing a heat-exchanging medium into the outer annular closed casing and means for removing said heat-exchanging medium out of said outer casing, an annular closed casing on the inside of said filtering chamber, means for introducing a heat-exchanging medium into said last mentioned casing and means for removing said medium out of said last mentioned casing, means whereby the upper end of said closed casing is secured to the lower end of the upper inner filtering section of the filtering chamber and further means securing the lower end of said annular closed casing to the upper end of the inner lower filtering section of the filtering chamber.

FERNAND BARIL.

References Cited in the file of this patent

UNITED STATES PATENTS

| Number | Name | Date |
|---|---|---|
| 487,323 | Ellis | Dec. 6, 1892 |
| 856,332 | Bendix et al. | June 11, 1907 |
| 1,219,796 | Atkins et al. | Mar. 20, 1917 |
| 1,247,979 | McHardy et al. | Nov. 27, 1917 |
| 1,866,970 | Garland et al. | July 12, 1932 |
| 1,877,157 | Cannon | Sept. 13, 1932 |
| 1,987,142 | Clements, Jr. | Jan. 8, 1935 |
| 2,189,458 | Carrier et al. | Feb. 6, 1940 |
| 2,300,849 | Tauch | Nov. 3, 1942 |
| 2,354,645 | Bateman | Aug. 1, 1944 |
| 2,521,347 | Davis | Sept. 5, 1950 |